Patented Feb. 22, 1949

2,462,674

UNITED STATES PATENT OFFICE 2,462,674

CHEMICAL PLASTICIZERS OR SOFTENERS FOR BUTYL RUBBER

John Rehner, Jr., Westfield, and Paul J. Flory, Cranford, N. J., assignors to Standard Oil Development Company, a corporation of Delaware No Drawing. Application October 22, 1943, Serial No. 507,302

4 Claims. (Cl. 260—29.1)

The invention relates to synthetic rubber-like substances; relates particularly to low temperature olefinic interpolymers which are reactive with sulfur; and relates especially to means for the plasticizing of high molecular weight interpolymers.

It has been found possible to interpolymerize an iso-olefin such as isobutylene with one or more polyolefinic monomers such as butadiene, isoprene, piperylene, dimethyl butadiene, and the like, at temperatures ranging from 0° C. or —40° C. to —160° C. by the application thereto of a dissolved Friedel-Crafts catalyst. These polymers have comparatively very high molecular weights, and comparatively low iodine numbers; and they are reactive with sulfur in a curing reaction which has some points of similarity to the vulcanization of rubber; to yield extremely valuable rubber-like synthetic bodies. However, difficulty is encountered in the milling and processing of many of these polymers especially those of very high molecular weight. The polymers of moderately high molecular weights are readily milled, cure readily and yield good rubber-like bodies but they do not have the maximum in tensile strength. Polymers having very high molecular weights yield cured bodies having exceedingly good tensile strength, elongation, abrasion resistances, flexure resistance and other valuable properties, but they are so tough that they are extremely difficult to mill, calender and extrude. The present invention provides a highly efficient means for improving the processing characteristics of these polymers through the use of benzoyl peroxide or similar organic peroxides as plasticizing agents, with minimum sacrifices in the desirable physical properties of the cured vulcanizate subsequently obtained.

Thus the process of the invention plasticizes high molecular weight olefinic polymers to permit them to be processed as readily as polymers of lower molecular weights, while retaining to a large degree the high tensile strength and other valuable properties characteristic of the products of higher molecular weights. The product of the invention likewise is a rubber-like polymer which is readily processed before curing, and shows an unusually high tensile strength and other valuable properties after curing. Other objects and details of the invention will be apparent from the following description:

In practising the invention, the polymeric material is preferably prepared from a mixture of a major proportion of an isoolefin which is preferably isobutylene, but may be other isoolefins such as 2-methyl butene-1, or 2-methyl penetene-1, or the like; together with a minor proportion of a polyolefinic monomer such as butadiene or isoprene or piperylene, or dimethyl butadiene, or myrcene, or dimethylallyl, or the like, the preferred polyolefins having from 4 to 12 or 14 carbon atoms per molecule. The olefinic material is cooled to temperatures ranging from 0° C. to —40° C. to —78° C. or to —100° C. or to —127° C. or even as low as —164° C., and the polymerization is conducted by the application to the cold olefinic material of a Friedel-Crafts catalyst dissolved in a low-freezing, non-complex-forming solvent such as ethyl or methyl chloride or carbon disulfide or the like.

The Friedel-Crafts catalyst may be any of the Friedel-Crafts catalysts disclosed by N. O. Calloway in his article on the "Friedel-Crafts Synthesis" appearing in the issue of "Chemical Reviews," published for the American Chemical Society at Baltimore in 1935, in Volume XVII, No. 3, the article beginning on page 327, the list being particularly well shown on page 375. For the solvent, substantially any of the lower mono- or polyalkyl halides having freezing points below about —10° C. may be used. The Friedel-Crafts catalyst is dissolved in the solvent and mixed with the cold olefinic material, preferably by application in the form of a spray to the surface of the rapidly stirred cold olefinic mixture. The polymerization thereupon proceeds rapidly to yield a solid polymer having a relatively very high molecular weight.

This molecular weight is conveniently determined by a measurement of the intrinsic viscosity of the polymer in solution, preferably in diisobutylene at 20° C. as outlined by E. O. Kramer in "Industrial and Engineering Chemistry," volume 30, page 1200 (1938). The preferred form of polymer has an intrinsic viscosity preferably within the range between 0.6 and about 5. This viscosity range, as shown by the work of Paul J. Flory, reported in the Journal of the American Chemical Society, volume 65, page 372 (1943), corresponds to an actual molecular weight between 120,000 and 3,000,000 (this being equivalent to the Staudinger number, or "molecular weight" by the Staudinger method of approximately 20,000 to 150,000). The preferred range of intrinsic viscosities lies between about 1 and 2.5, corresponding to actual molecular weights of 400,000 to 1,100,000; and corresponding to Staudinger numbers between about 31,000 and 78,000.

The relationship between the intrinsic viscosity of a polymer in solution in diisobutylene at 20° C., the Staudinger number and the viscosity average molecular weight is well shown in the following table:

| Intrinsic Viscosity in Diisobutylene at 20° C. [$\eta$] | Staudinger Number $\times 10^{-3}$ | Viscosity Average Molecular Weight $\times 10^{-3}$ |
| --- | --- | --- |
| 0.20 | 6.2 | 21.2 |
| .40 | 12.5 | 63 |
| .60 | 18.7 | 120 |
| .80 | 24.9 | 185 |
| 1.00 | 31.2 | 264 |
| 1.25 | 39.0 | 373 |
| 1.50 | 46.8 | 495 |
| 1.75 | 54.7 | 630 |
| 2.00 | 62.5 | 775 |
| 2.5 | 78.1 | 1,100 |
| 3.0 | 93.7 | 1,460 |
| 3.5 | 109 | 1,860 |
| 4.0 | 125 | 2,300 |
| 5.0 | 156 | 3,250 |

The "intrinsic viscosity" is given by the equation $$(1n\eta_r)/c$$

where $\eta_r$ is the relative viscosity (ratio of viscosity of solution to that of the solvent) of a dilute solution of the polymer in diisobutylene at 20° C., and $c$ is the concentration of polymer in gms. per 100 cc. The concentration should be such that $\eta_r$ does not exceed about 1.4. (See E. O. Kraemer, Ind. Eng. Chem. 30, 1200 (1938) for the definition of the term "intrinsic viscosity" designated by [$\eta$]. Staudinger numbers, formerly referred to as "molecular weights," are obtained by multiplying [$\eta$] by about $3.12 \times 10^4$.)

The iodine number of the polymer (as determined by the Wijs method) may range between about 0.5 and 40 or 50; the preferred range being between about 1 and 8 or 10.

After the completion of the polymerization reaction, the solid polymer is separated from the liquid residue of the reaction mixture and brought up to room temperature. It is conveniently washed and purified on the mill to remove traces of catalyst and residual traces of unpolymerized material, and it is then ready for compounding.

For compounding, the polymers may be mixed with sulfur and a sulfurization aid such as tetramethyl thiuram disulfide, or the like, and addition agents such as zinc oxide, carbon black, stearic acid, and the like; and may then be cured at temperatures ranging from room temperature up to about 180° C. for time intervals ranging from hours to a few minutes, depending upon the temperature, to yield cured materials having tensile strengths ranging from 2500 to 4600 pounds per square inch and elongations at break ranging from 700% to 1200%.

However, the compounding procedure with the higher molecular weight polymers especially those ranging from 1,000,000 upwards, is found to be difficult because of the extremely tough character of these polymers.

According to the present invention, when the olefinic material has been polymerized, warmed up to room temperature and thoroughly dried of volatile ingredients, it is compounded with a softening agent in the form of an organic peroxide. For this purpose, benzoyl peroxide is highly advantageous, but many other organic peroxides such as tetralin peroxide or ascaridole, or the like, may be used. The presence of the organic peroxide reduces the power required for the compounding mill, causes "banding" on the rolls in a much shorter time, permits of easy calendering and extruding, and, in general, greatly simplifies the processing treatment and improves the workability of the polymer.

EXAMPLE 1

A mixture was prepared consisting of 95 parts by weight of liquid isobutylene of about 98.5% purity and 5 parts by weight of isoprene of about 96% purity. This material was cooled to a temperature of about −100° C. by the presence in the mixture of approximately 300 parts of liquid ethylene per 100 parts of mixed reactants and it was polymerized by the addition to the cold reactant mixture of approximately 10 parts of catalyst solution containing approximately 0.9% of aluminum chloride dissolved in ethyl chloride. The resulting polymer was found to have a molecular weight of approximately 1,000,000 (a Staudinger number of about 75,000) and an iodine number of approximately 1.5.

This polymer was compounded according to the following recipe:

| | Parts by weight |
| --- | --- |
| Butyl rubber | 100.0 |
| Zinc oxide | 5.0 |
| Stearic acid | 2.0 |
| Sulfur | 2.5 |
| Carbon black | 36.0 |
| Mercaptobenzothiazole | 1.0 |
| Diorthotolylguanidine | 0.25 |

This recipe was compounded by three different procedures and in three different forms. For the first one, the necessary amounts of the several substances were measured out, the polymer placed in a Banbury mill, and milled for about 15 minutes at 300° F. with 0.4 part of a commercial rubber softener xylyl mercaptan dissolved in mineral oil. The second form of the recipe was prepared by placing the polymer in the Banbury mill and milling it for 15 minutes at 300° F. with 0.3 part of benzoyl peroxide. The third portion was prepared on the open roll mill without the addition of any softener whatever.

It was noted during the preparation of this recipe that the commercial softener xylyl mercaptan gave a perceptible softening effect upon the polymer, sufficient in amount to permit of somewhat easier milling. The second portion prepared with the benzoyl peroxide was found to be well softened, and found to mill in the Banbury as easily as well-softened natural rubber, or better. The third portion milled on the open roll mill without softener was found to be extremely difficult to prepare; prolonged milling being required, great difficulty being encountered in getting the material to band on the mill, and great difficulty being encountered in getting a homogeneous compound.

When the three compounds were fully prepared, they were cut into samples and cured for varying lengths of time, as shown in the subjoined Table I, and were then cut into test samples and evaluated to yield comparative test records.

TABLE I

|  | 1431—1 | | | 1431—2 | | | 1431—3 | | |
|---|---|---|---|---|---|---|---|---|---|
| Treatment of rubber | Banburied 15' at 300° F. with 0.4 RPA #3 | | | Banburied 15' at 300° F. with 0.3 Benzoyl Peroxide | | | None | | |
| Williams Plasticity | 124—20 | | | 138—27 | | | 162—54 | | |
|  | Tens. | Mod. | Elong. | Tens. | Mod. | Elong. | Tens. | Mod. | Elong. |
| Cured: | | | | | | | | | |
| 15'/307° F | 1,353 | 400 | 767 | 1,443 | 500 | 687 | 1,322 | 697 | 523 |
| 30'/307° F | 1,405 | 462 | 717 | 1,347 | 569 | 600 | 1,308 | 758 | 467 |
| 60'/307° F | 1,257 | 773 | 450 | 1,150 | 838 | 397 | 938 | 938 | 300 |
| Crescent Tear (15'—30'—60' cures) | 177 | 125 | 87 | 144 | 120 | 87 | 137 | 124 | 93 |
| Aged 2 days air oven at 250° F. | Tens. | Elong. | Per Cent Tens. Retain. | Tens. | Elong. | Per Cent Tens. Retain. | Tens. | Elong. | Per Cent Tens. Retain. |
| Cured: | | | | | | | | | |
| 15'/307° F | 1,112 | 470 | 82 | 1,115 | 453 | 77 | 1,005 | 390 | 76 |
| 30'/307° F | 1,075 | 457 | 76 | 1,055 | 453 | 78 | 987 | 357 | 75 |
| 60'/307° F | 1,067 | 457 | 85 | 1,063 | 457 | 92 | 1,013 | 443 | 100 |
| Per cent Rebound (45'—90' cures): | | | | | | | | | |
| At Room Temp | | 31.1—33.0 | | | 32.2—33.0 | | | 33.0—32.6 | |
| At 100° C | | 56.8—58.3 | | | 55.9—57.9 | | | 55.4—59.9 | |
| Flexometer Data (45'—90' cures): | | | | | | | | | |
| Static Compression | | .447—.383 | | | .414—.371 | | | .374—.341 | |
| Initial Dynam. Compres | | .305—.251 | | | .275—.237 | | | .249—.212 | |
| Dynamic Drift | | .139—.166 | | | .160—.147 | | | .127—.099 | |
| Temper. Rise ° C | | 66.0—44.5 | | | 52.4—36.7 | | | 29.8—20.5 | |
| Time of Run, minutes | | 16—30 | | | 30—30 | | | 30—30 | |
| Appearance | | V. Poor—Good | | | Excellent | | | Excellent | |

This inspection record shows that the physical properties (except perhaps the hysteresis) do not suffer as a result of the plasticization by benzoyl peroxide, and further shows that the properties as a whole are somewhat better than those obtained with xylyl mercaptan. In addition, the benzoyl peroxide gives a very greatly improved ease of calendering and ease and speed of extrusion, resulting in a smooth sample of excellent appearance, whereas the commercial plasticizer results in only a slight gain in extrudability and processability and produces a poor-looking, rough and unsatisfactory extrusion material.

EXAMPLE 2

A similar polymer was prepared to that in Example 1, and samples of the finished polymer were prepared on the Banbury mill according to the recipes shown in the subjoined Table II.

These inspection records of Table II show the maintenance of the quality of the cured polymer, and the total lack of harm to the polymer from the softening agent. The labor of preparation is very greatly reduced by the presence of the peroxide.

In Example 1, the facts are well shown by the Williams plasticity values which is greatly reduced by both the RPA No. 3 and the benzoyl peroxide; the polymer in the absence of a softener showing a Williams plasticity of 162—54; with the benzoyl peroxide as softener of 138—27 and with the xylyl mercaptan dissolved in mineral oil as softener of 124—20. It will be noted that the xylyl mercaptan gives a greater softening effect, but the flexure resistance is reduced by the xylyl mercaptan, the temperature rise is increased, and the initial dynamic compression of the cured material likewise is increased. In

TABLE II

Plasticizing Effect of Peroxides

|  |  |  |  |  |
|---|---|---|---|---|
| Polymer | 100.0 | 100.0 | 100.0 | 100.0 |
| Stearic Acid | 3.0 | 3.0 | 3.0 | 3.0 |
| Zinc Oxide | 5.0 | 5.0 | 5.0 | 5.0 |
| Tetramethyl thiuram disulfide | 1.0 | 1.0 | 1.0 | 1.0 |
| Channel grade carbon black | 50.0 | 50.0 | 50.0 | 50.0 |
| Mercaptobenzothiazole | 0.5 | 0.5 | 0.5 | 0.5 |
| Sulfur | 2.0 | 2.0 | 2.0 | 2.0 |
| Benzoyl Peroxide |  | 0.5 |  |  |
| Tetralin Peroxide |  |  | 0.5 |  |
| Ascaridole (camphor peroxide) |  |  |  | 0.5 |
| Williams Plasticity—Recovery at 70° C.+5 kg | 158—19 | 148—18 | 153—18 | 152—15 |
| Tensile—Mod. at 300%—Elong. at 70° F. (unaged): |  |  |  |  |
| 30' cure (307° F.) | 2765—409—748 | 2728—364—795 | 2800—358—794 | 2752—362—792 |
| 60' cure (307° F.) | 2810—612—720 | 2792—461—735 | 2854—500—750 | 2818—515—740 |
| Crescent Tear at 70° F. (unaged): |  |  |  |  |
| 30' cure (307° F.) | 482 | 558 | 571 | 535 |
| 60' cure (307° F.) | 552 | 514 | 534 | 474 |
| Per cent rebound angle 10° at 90° F.: |  |  |  |  |
| 45' cure (307° F.) | 34.5 | 32.2 | 33.3 | 32.2 |
| 75' cure (307° F.) | 35.7 | 33.3 | 33.9 | 32.2 |
| Per cent rebound angle 10° at 100° C.: |  |  |  |  |
| 45' cure (307° F.) | 58.1 | 56.7 | 56.7 | 56.7 |
| 75' cure (307° F.) | 58.8 | 58.1 | 58.8 | 57.4 |
| Goodrich Flexometer 45' and 75' cure at 307° F.: |  |  |  |  |
| Shore hardness | 59—63 | 56—57 | 53—55 | 53—59 |
| Static compres | 305—269 | 329—333 | 343—325 | 312—320 |
| Init. Dyn. Comp | 294—252 | 316—317 | 325—303 | 304—297 |
| Dynamic Drift | 79—60 | 96—63 | 73—46 | 91—45 |
| Time (min.) | 30—30 | 30—30 | 30—30 | 30—30 |
| Temp. rise | 27°—23.4° | 28°—26.6° | 29.8°—24° | 28.3°—23.8° |
| Appearance | O. K.—O. K. | O. K.—O. K. | O. K.—O. K. | O. K.—O. K. |

Table II, the Williams plasticity shows a smaller softening effect due to the very much higher molecular weight of the polymer used. Nevertheless, the softening effect obtained is sufficient to permit of satisfactory milling and fully satisfactory calendering and extrusion. The softening is also shown by the reduction in Shore hardness; and, while this also is not great, it is sufficient to permit of easy and satisfactory milling without injury to the characteristics of the finished stock.

EXAMPLE 3

A similar polymer was prepared as in Examples 1 and 2, similarly cured and evaluated to yield inspection results as shown in Table III. These results also show an effective softening of the polymer without harm to its physical properties.

TABLE III

| | | | | |
|---|---|---|---|---|
| Polymer | 100.0 | 100.0 | 100.0 | 100.0 |
| Stearic acid | 3.0 | 3.0 | 3.0 | 3.0 |
| Zinc Oxide | 5.0 | 5.0 | 5.0 | 5.0 |
| Tetramethyl thiuram disulfide | 1.0 | 1.0 | 1.0 | 1.0 |
| Channel grade carbon black | 50.0 | 50.0 | 50.0 | 50.0 |
| Mercaptobenzothiazole | 0.5 | 0.5 | 0.5 | 0.5 |
| Sulfur | 2.0 | 2.0 | 2.0 | 2.0 |
| Benzoyl Peroxide | | 0.5 | | |
| Tetralin Peroxide | | | 0.5 | |
| Ascaridole | | | | 0.5 |
| Tensile—Mod. at 300%—Elong. at 70° F. (unaged): | | | | |
| 30' cure (307° F.) | 2830—361—780 | 2138—350—830 | 2925—363—800 | 2863—303—815 |
| 60' cure (307° F.) | 2915—495—740 | 3080—481—770 | 2968—504—723 | 3038—472—755 |
| Tensile—Mod. at 300%—Elong. at 70° F., aged 48 hrs. at 250° F.: | | | | |
| 30' cure (307° F.) | 2585—556—672 | 2792—594—715 | 2622—643—665 | 2670—538—712 |
| 60' cure (307° F.) | 2492—670—728 | 2625—572—728 | 2550—535—707 | 2605—539—678 |

EXAMPLE 4

A similar polymer to that in Example 1 was prepared and compounded as in Example 1 but with larger amounts of the peroxides as shown in Table IV. It will be noted that the larger amount of peroxides gives a greater softening effect, especially for the benzoyl peroxide as indicated by the Williams plasticity. However, as before, relatively very little damage is done to the ultimate physical properties of the polymer. The greater softness is also well shown by the change in value for the Shore hardness.

average molecular weight of the polymer, and the range of molecular weight in the polymer; the presence of comparatively small amounts of relatively low molecular weight exerting a substantial softening effect, but also exerting a harmful effect on the ultimate physical properties. For this reason, it is desirable that the polymer be prepared with a relatively high average molecular weight, and a very narrow molecular weight range, in order to avoid the presence of harmful low polymers. The peroxide softeners of the present invention are particularly effective with a polymer of relatively narrow molecular weight range.

That is, it is preferable to prepare a "tough" polymer having a high average molecular weight, and a narrow molecular weight range; and then soften the polymer by the use of the peroxides of the present invention rather than to prepare a polymer having a very wide molecular weight range, since the wide molecular weight range results in much poorer ultimate physical properties.

The proportion of peroxide may be varied over a comparatively wide range. About the minimum amount which shows a useful effect is from 0.05 to 0.1%. The preferred range is from 0.1 to 1.0%, as much as 1% yielding a softening effect which is usually sufficient for commercial milling. However, in some instances, still great-

TABLE IV

*Plasticizing effect of peroxides*

| | 4758—1 | 4758—2 | 4758—3 | 4758—4 |
|---|---|---|---|---|
| Stock No. | | | | |
| GR-I 03—09—43 | 100.0 | 100.0 | 100.0 | 100.0 |
| Zinc Oxide | 5.0 | 5.0 | 5.0 | 5.0 |
| Stearic Acid | 3.0 | 3.0 | 3.0 | 3.0 |
| Tetramethyl thiuram disulfide | 1.0 | 1.0 | 1.0 | 1.0 |
| Channel grade carbon black | 50.0 | 50.0 | 50.0 | 50.0 |
| Mercaptobenzothiazole | 0.5 | 0.5 | 0.5 | 0.5 |
| Sulfur | 2.0 | 2.0 | 2.0 | 2.0 |
| Benzoyl Peroxide | | 1.0 | | |
| Tetralin Peroxide | | | 1.0 | |
| Ascaridole | | | | 1.0 |
| Williams Plasticity—Recovery at 70° C. and 5 Kg. after Banburying | 165—15 | 119—7 | 159—17 | 156—16 |
| Per cent Rebound at 91° F.—angle 10°: | | | | |
| 45' cure (307° F.) | 32.7 | 31.1 | 32.2 | 31.6 |
| 75' cure (307° F.) | 35.1 | 31.6 | 32.2 | 31.1 |
| Per cent Rebound at 100° C.—angle 10°: | | | | |
| 45' cure (307° F.) | 54.4 | 47.3 | 54.4 | 52.9 |
| 75' cure (307° F.) | 58.8 | 49.3 | 56.7 | 54.4 |
| Crescent Tear at 70° F. (unaged): | | | | |
| 30' cure (307° F.) | 417 | 348 | 428 | 399 |
| 60' cure (307° F.) | 434 | 390 | 399 | 478 |
| Shore Hardness: | | | | |
| 30' cure (307° F.) | 55 | 50 | 52 | 50 |
| 60' cure (307° F.) | 60 | 60 | 55 | 53 |
| Tensile—Mod. at 300%—Elong. (unaged): | | | | |
| 30' cure (307° F.) | 2673—214—830 | 2092—177—925 | 2802—136—912 | 2700—110—937 |
| 60' cure (307° F.) | 2948—432—767 | 2372—385—775 | 3040—310—850 | 2992—275—812 |
| Tensile—Mod. at 300%—Elong. aged 48 hrs. air oven at 250° F.: | | | | |
| 30' cure (307° F.) | 2475—569—715 | 2085—542—700 | 2590—500—735 | 2540—487—750 |
| 60' cure (307° F.) | 2300—593—755 | 2060—522—700 | 2485—442—750 | 2225—435—700 |

It will be noted that the plasticity of a given sample depends in part upon the amount of peroxide added, and also upon the conditions of milling, including temperature, time, character of mill, and the like; and, in addition, the plasticity is in large part dependent both upon the er softening is desired, and for this purpose amounts of peroxide as great as 5% or occasionally even as great as 7 or 8% are useful. This is particularly so for those manufacturing operations where a rubber which is on the verge of a syrupy character is desired. With most types of polymers, 4 or 5% of peroxide will yield a very soft polymer which is on the verge of a syrupy consistency. However, with the extremely high molecular weight polymers which are readily synthesized, and which are extremely tough and hard to mill, still greater amounts of peroxide are required to produce a really syrupy consistency. With some of the less effective peroxides, even greater amounts up to 10 or 12% may be required to yield a syrupy consistency. These amounts, however, are usually undesirable because of the cost and because of the appearance of a minor tendency to reduce the physical properties.

It may be noted that, while only three organic peroxides are indicated, tests of all of the organic peroxides available indicate that organic peroxides in general are useful for this polymerization reaction; and, while it has not been possible to the present to test every theoretically possible organic peroxide, the functioning of those which have been tested indicates clearly that all organic peroxides are useful for their softening effect, in some measure.

Thus, the process of the invention greatly simplifies the processing of low temperature polymer material, by improving its plasticity, before curing without injury to its cured properties to permit of much superior milling, extruding, compounding and other fabricating operations; by the incorporation into the polymer before curing of an organic peroxide substance.

While there are disclosed but a limited number of embodiments of the process and product of the invention, it is possible to produce still other embodiments without departing from the inventive concept herein disclosed, and it is therefore desired that only such limitations be imposed upon the appended claims as are stated therein or required by the prior art.

The invention claimed is:

1. In the processing of a high molecular weight copolymer prepared by the steps of mixing together a major proportion of isobutylene with a minor proportion of a polyolefinic monomer having from 4 to 10 inclusive carbon atoms per molecule, cooling the mixture to a temperature within the range between −40° C. and −127° C. and polymerizing the cold mixture by the application thereto of a Friedel-Crafts catalyst dissolved in a low-freezing, non-complex-forming solvent; the copolymer being characterized by an iodine number within the range between 0.5 and 50; an actual molecular weight between 120,000 and 3,000,000, and reactivity with sulfur in a curing reaction; the steps in combination of milling into the polymer a portion of a cyclic carbon ring peroxide having from 10 to 14 inclusive carbon atoms per molecule and at least two coupled oxygen atoms in the molecule in a proportion within the range between 0.05% and 5% of the polymer; and thereafter continuing the milling of the polymer to improve the plasticity by a substantial amount.

2. In the processing of a high molecular weight copolymer prepared by the steps of mixing together a major proportion of isobutylene with a minor proportion of a polyolefinic monomer having from 4 to 10 inclusive carbon atoms per molecule, cooling the mixture to a temperature within the range between −40° C. and −127° C. and polymerizing the cold mixture by the application thereto of a Friedel-Crafts catalyst dissolved in a low-freezing, non-complex-forming solvent; the copolymer being characterized by an iodine number within the range between 0.5 and 50; an actual molecular weight between 120,000 and 3,000,000 and reactivity with sulfur in a curing reaction; the steps in combination of milling into the polymer a portion of benzoyl peroxide in a proportion within the range between 0.05% and 5% of the polymer, and thereafter continuing the milling of the polymer to improve the plasticity by a substantial amount.

3. In the processing of a high molecular weight copolymer prepared by the steps of mixing together a major proportion of isobutylene with a minor proportion of a polyolefinic monomer having from 4 to 10 inclusive carbon atoms per molecule, cooling the mixture to a temperature within the range between −40° C. and −127° C. and polymerizing the cold mixture by the application thereto of a Friedel-Crafts catalyst dissolved in a low-freezing, non-complex-forming solvent; the copolymer being characterized by an iodine number within the range between 0.5 and 50; an actual molecular weight between 120,000 and 3,000,000, and reactivity with sulfur in a curing reaction; the steps in combination of milling into the polymer a portion of tetralin peroxide in a proportion within the range between 0.05% and 5% of the polymer, and thereafter continuing the milling of the polymer to improve the plasticity by a substantial amount.

4. In the processing of a high molecular weight copolymer prepared by the steps of mixing together a major proportion of isobutylene with a minor proportion of a polyolefinic monomer having from 4 to 10 inclusive carbon atoms per molecule, cooling the mixture to a temperature within the range between −40° C. and −127° C. and polymerizing the cold mixture by the application thereto of a Friedel-Crafts catalyst dissolved in a low-freezing, non-complex-forming solvent; the copolymer being characterized by an iodine number within the range between 0.5 and 50; an actual molecular weight between 120,000 and 3,000,000 and reactivity with sulfur in a curing reaction; the steps in combination of milling into the polymer a portion of ascaridol in a proportion within the range between 0.05% and 5% of the polymer, and thereafter continuing the milling of the polymer to improve the plasticity by a substantial amount.

JOHN REHNER, JR.
PAUL J. FLORY.

REFERENCES CITED

The following references are of record in the file of this patent:

UNITED STATES PATENTS

| Number | Name | Date |
| --- | --- | --- |
| 2,258,268 | Sparks | Oct. 7, 1941 |
| 2,305,007 | Hopff et al. | Dec. 15, 1942 |
| 2,317,385 | Koch | Apr. 27, 1943 |
| 2,326,595 | Young | Aug. 10, 1943 |
| 2,327,975 | Zaucker | Aug. 24, 1943 |
| 2,391,742 | Roberts | Dec. 25, 1945 |
| 2,393,321 | Haworth | Jan. 22, 1946 |

FOREIGN PATENTS

| Number | Country | Date |
| --- | --- | --- |
| 538,983 | Great Britain | Aug. 25, 1941 |